US008480496B2

(12) United States Patent
Tomita

(10) Patent No.: US 8,480,496 B2
(45) Date of Patent: Jul. 9, 2013

(54) ONLINE GAME SERVER, ONLINE GAME PROGRAM PRODUCT AND GAME APPARATUS

(75) Inventor: Yosuke Tomita, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 860 days.

(21) Appl. No.: 12/116,625

(22) Filed: May 7, 2008

(65) Prior Publication Data
US 2008/0300060 A1    Dec. 4, 2008

(30) Foreign Application Priority Data

May 31, 2007 (JP) ................................. 2007-145657

(51) Int. Cl.
*A63F 13/00* (2006.01)
(52) U.S. Cl.
USPC ................. 463/42; 463/31; 725/42; 705/14.5
(58) Field of Classification Search
USPC ......................... 463/42, 1–6, 41, 43; 705/14.4
See application file for complete search history.

(56) References Cited

U.S. PATENT DOCUMENTS

| | | | | |
|---|---|---|---|---|
| 6,928,414 B1* | 8/2005 | Kim | ............................. | 705/14.5 |
| 6,970,833 B1* | 11/2005 | Fuchs | ........................ | 705/14.14 |
| 7,596,540 B2* | 9/2009 | Tzruya et al. | ................... | 706/47 |
| 2001/0009867 A1 | 7/2001 | Sakaguchi et al. | | |
| 2001/0009868 A1 | 7/2001 | Sakaguchi et al. | | |
| 2001/0018667 A1* | 8/2001 | Kim | ................ | 705/14 |
| 2002/0022516 A1* | 2/2002 | Forden | ............................. | 463/32 |
| 2004/0030595 A1* | 2/2004 | Park | ................................ | 705/14 |
| 2004/0148221 A1 | 7/2004 | Chu | | |
| 2004/0152518 A1 | 8/2004 | Kogo | | |
| 2006/0085261 A1 | 4/2006 | Chu | | |
| 2006/0111979 A1 | 5/2006 | Chu | | |
| 2006/0195420 A1 | 8/2006 | Kilroy | | |
| 2006/0195427 A1 | 8/2006 | Kilroy | | |

(Continued)

FOREIGN PATENT DOCUMENTS

EP    1437876 A    7/2004
JP    2001-340651    12/2001

(Continued)

OTHER PUBLICATIONS

English language translation of JP 2002-085849, Mar. 26, 2002.

(Continued)

*Primary Examiner* — Ronald Laneau
*Assistant Examiner* — Ross Williams
(74) *Attorney, Agent, or Firm* — Greenblum & Bernstein, P.L.C.

(57) ABSTRACT

An online game server delivers an online game to a player terminal via a communication network. The online game is played in the player terminal operated by a player. The online game server receives object selection information indicating that an object selectably displayed on a game display screen of the online game is selected at the player terminal. The online game server then transmits related site specification information to the player terminal on the basis of the received object selection information. The related site specification information is used for the player terminal to access a related site related to the object. Game progress information necessary for progress of the online game is included in the related site. The related site specification information is a URL indicating an address of the related site or a search formula for searching for the related site using a search engine.

10 Claims, 4 Drawing Sheets

U.S. PATENT DOCUMENTS

| | | | |
|---|---|---|---|
| 2007/0004507 A1 | 1/2007 | Nakajima et al. | |
| 2007/0072676 A1 | 3/2007 | Baluja | |
| 2008/0009352 A1 | 1/2008 | Aoyama et al. | |
| 2008/0045336 A1* | 2/2008 | Stelzer et al. | 463/30 |
| 2008/0254889 A1* | 10/2008 | Sispoidis et al. | 463/42 |
| 2009/0227378 A1* | 9/2009 | Rom et al. | 463/42 |

FOREIGN PATENT DOCUMENTS

| | | |
|---|---|---|
| JP | 2002-85849 | 3/2002 |
| JP | 2002-210237 | 7/2002 |
| JP | 2002-288538 | 10/2002 |
| JP | 2003-58777 | 2/2003 |
| JP | 2003-108870 | 4/2003 |
| JP | 2003-534109 | 11/2003 |
| JP | 2005-321675 | 11/2005 |
| JP | 2007-72543 | 3/2007 |
| WO | 01/91869 | 12/2001 |
| WO | 02/01461 A2 | 1/2002 |
| WO | 03/044709 A | 5/2003 |
| WO | 2004/068278 | 8/2004 |

OTHER PUBLICATIONS

English language Abstract of JP 2003-108870, Apr. 11, 2003.
English language Abstract of JP 2007-72543, Mar. 22, 2007.
English language Abstract of JP 2002-210237, Jul. 30, 2002.
English language Abstract of JP 2001-340651, Dec. 11, 2001.
English language Abstract of JP 2005-321675, Nov. 17, 2005.
English language Abstract of JP 2002-288538, Oct. 4, 2002.
English language Abstract of JP 2003-58777, Feb. 28, 2003.
English language Abstract of JP 2002-85849.

* cited by examiner

ONLINE GAME SERVER, ONLINE GAME PROGRAM PRODUCT AND GAME APPARATUS

CROSS-REFERENCE TO RELATED APPLICATION

The present disclosure relates to subject matter contained in Japanese Patent Application No. 2007-145657, filed on May 31, 2007, the disclosure of which is expressly incorporated herein by reference in its entirety.

BACKGROUND OF THE INVENTION

1. Field of the Invention

The present invention relates to an online game server that delivers an online game played in a player terminal operated by a player via a communication network, an online game program product and a game apparatus. In particular, the present invention relates to an online game server, an online game program product and a game apparatus capable of accessing to a related site related to an object in an online game without spoiling interest of the player in the online game.

2. Description of the Related Art

Heretofore, a game method and a game system have been known which aim to carry out an advertisement for articles (goods or products) more effectively by causing a display device to display an advertisement for articles or the like on a display screen separately in the case where a predetermined condition (for example, passing through a path A or the like) is met in a game such as an online game displayed on the display screen by means of operations of a player (for example, see Japanese Patent Application Publication No. 2002-85849).

However, in the game method and the game system disclosed in Japanese Patent Application Publication No. 2002-85849, the display device may be caused to display an advertisement for unrelated articles (goods) and the like, which has no relation to the game or progress of the game, by interrupting the game while the game proceeds. Further, in the game method and the game system, questions and answers relating to such an advertisement may be carried out against the player. Thus, there has been a problem that interest of a player in the game may be spoiled extremely.

SUMMARY OF THE INVENTION

It is one object of the present invention to solve the problems described above and to provide an online game server, an online game program product and a game apparatus capable of accessing a related site related to an object in a game without spoiling interest of a player in the online game.

In order to achieve the above object, one aspect of the present invention is directed to an online game server for delivering an online game to a player terminal via a communication network. In this case, the online game is played in the player terminal operated by a player. The online game server of the present invention includes a selection information receiver that receives object selection information, the object selection information indicating that an object selectably displayed on a game display screen of the online game is selected at the player terminal.

The online game server also includes a specification information transmitter that transmits related site specification information to the player terminal on the basis of the object selection information received by the selection information receiver, the related site specification information being used for the player terminal to access a related site related to the object, game progress information necessary for progress of the online game being included in the related site.

Since the online game server has the configuration described above, the player terminal is allowed to access the related site in which the game progress information related to the object and necessary for progress of the online game is included when to select the object in the game display screen during progress of the online game. Namely, since the player terminal is allowed to access the related site as part of playing the online game without interruption of the online game, this allows the player terminal to access the related site related to the object in the online game without spoiling interest of a player in the online game.

It is preferable that an advertisement for the object is placed in the related site. By constructing the online game server in this manner, it is possible to make an advertisement for the object without interruption of the online game.

It is preferable that the related site specification information is a URL indicating an address of the related site or a search formula for searching for the related site using a search engine. By constructing the online game server in this manner, it is possible to securely access the related site easily and directly from the player terminal without the aid of the online game server.

It is preferable that the online game server further includes an access counter that counts up the number of times of access when the specification information transmitter transmits the related site specification information to the player terminal, the transmission of the related site specification information indicating that access to the related site is carried out by the player terminal. It is also preferable that the online game server further includes an accounting information accumulator that accumulates accounting information for an administrator of the related site in accordance with the number of times of access counted up by the access counter. By constructing the online game server in this manner, the player terminal is allowed to access the related site effectively without placing financial burdens such as a development cost and a management cost of the online game on an online game provider (the side of delivering the online game), and this makes it possible to widely deliver an online game capable of improving the number of times of access of the player terminals.

Further, in another aspect of the present invention, the present invention is directed to an online game program product for causing an online game server to execute an online game delivering process. In this case, the online game server delivers an online game to a player terminal via a communication network, and the online game is played in the player terminal operated by a player. The online game program product of the present invention causes the online game server to execute the steps including receiving object selection information, the object selection information indicating that an object selectably displayed on a game display screen of the online game is selected at the player terminal.

The steps also include transmitting related site specification information to the player terminal on the basis of the object selection information received by the selection information receiver, the related site specification information being used for the player terminal to access a related site related to the object, game progress information necessary for progress of the online game being included in the related site.

Since the online game program product has the configuration described above, the player terminal is allowed to access the related site in which the game progress information related to the object and necessary for progress of the online game is included in the case where the object is selected in the game display screen during progress of the online game. This makes it possible to access the related site related to the object in the online game without spoiling interest of a player in the online game.

Moreover, in still another aspect of the present invention, the present invention is directed to a game apparatus for executing a game. In this case, a player plays the game by operating the game apparatus. The game apparatus of the present invention includes an object selection receiver that receives selection of an object by the player, the object being selectably displayed on a game display screen of the game.

The game apparatus also includes a related site searcher that searches for a related site, the related site being related to the object received by the object selection receiver, game progress information necessary for progress of the game being included in the related site.

The game apparatus also includes a related site access controller that causes the game apparatus to access the related site on the basis of a result of search searched for by the related site searcher.

Since the game apparatus has the configuration described above, the game apparatus is allowed to search for the related site in which the game progress information related to the object and necessary for progress of the online game is included and to access this related site when the object in the game display screen is selected by the player during progress of the game. Therefore, the game apparatus is allowed to surely access the related site related to the object in the game as part of playing the game without interruption of the game and without spoiling interest of the player in the game.

It is preferable that the related site searcher searches for the related site using a search engine, and the related site access controller causes the game apparatus to access a related site that is placed on the highest rank by the search engine in the case where the result of search includes a plurality of related sites. By constructing the game apparatus in this manner, the game apparatus is always allowed to access the related site of the object in the game even in the case where an address of the related site or the like is changed.

It is preferable that the game apparatus also includes a display controller that causes a display device to display the related site accessed by the related site access controller on a display screen of the display device. By constructing the game apparatus in this manner, it is possible to display the contents of the related site not only on the game display screen but also on a display screen of other display device. Therefore, the related site can be visibly displayed on various display screens for the player.

According to the present invention, it is possible for a player terminal (game apparatus) to access a related site related to an object in an online game without spoiling interest of a player in the online game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of an online game server, an online game program product and a game apparatus according to the present invention will now be described in detail with reference to the appending drawings.

Figure 1:
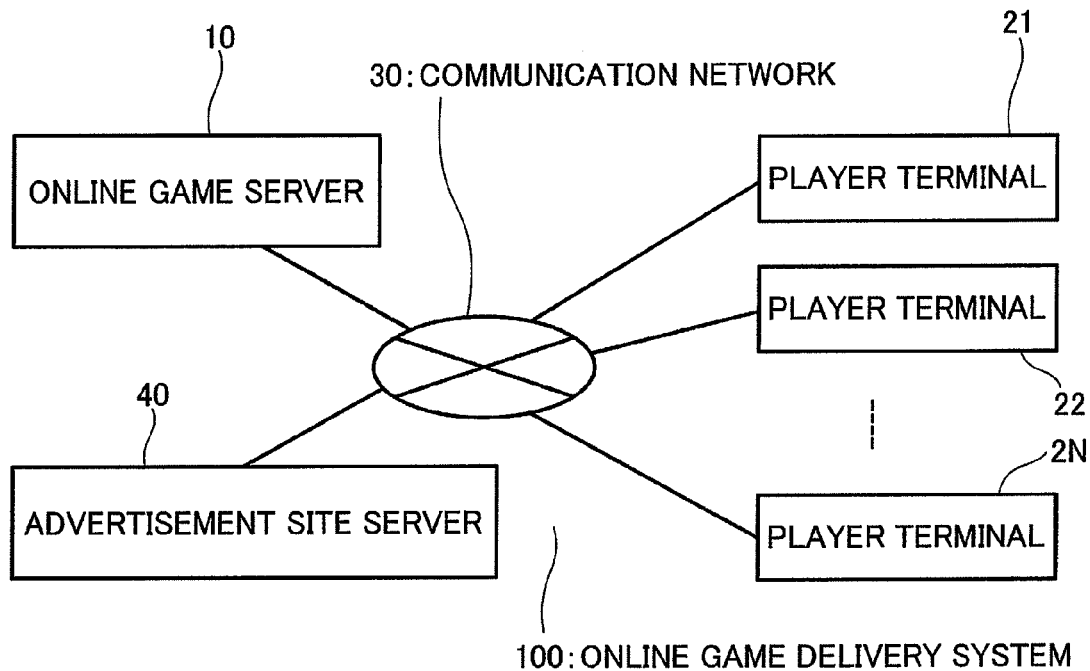
FIG. 1 is a block diagram that shows an example of a configuration of an online game delivery system according to one embodiment of the present invention.

FIG. 1 is a block diagram that shows an example of a configuration of an online game delivery system according to one embodiment of the present invention. As shown in FIG. 1, an online game delivery system 100 includes an online game server 10, a plurality of player terminals 21 to 2N ("N" is an arbitrary integer), and an advertisement site server 40.

Each of the online game server 10, the plurality of player terminals 21 to 2N and the advertisement site server 40, which constitute the online game delivery system 100, is connected to a communication network 30 such as the Internet, for example.

The online game server 10 is managed by a system administrator of the online game delivery system 100, for example. The advertisement site server 40 is managed by a site administrator who manages an advertisement site, for example. The online game server 10 and the advertisement site server 40 have various functions for delivering an online game and the advertisement site related to an object (item and the like) in the online game to each of the player terminals 21 to 2N. Each of the online game server 10 and the advertisement site server 40 is configured by an information processing apparatus such as a WWW server.

Each of the player terminals 21 to 2N is managed by a player (user) who plays the online game, and is configured from, for example, an information processing apparatus such as a personal computer and a personal digital assistant. Each of the player terminals 21 to 2N is provided with hardware such as a communication module for connecting to the communication network 30 and software such as communication software. Each of the player terminals 21 to 2N is provided with a display device having an image display section (display screen) constructed from a television apparatus, a liquid crystal display or the like inside or outside the player terminal.

Here, the online game of the present embodiment is a game that is delivered to each of the player terminals 21 to 2N from the online game server 10 via the communication network 30 by means of downloading (DL) or the like, for example, and is played in each of the player terminals 21 to 2N in response to operations of the player. In the online game, when an object selectably displayed on a game display screen is selected, access to the advertisement site server 40, which launches an advertisement site as a related site that is related to this object and includes game progress information necessary for progress of the online game, is carried out, and the advertisement site is displayed so as to be available for browsing as part of playing the online game.

In the online game delivery system 100, the player is allowed to browse an advertisement and the like of an object without uncomfortable feeling as part of playing the online game while the delivered online game is caused to proceed by selecting an object in the game display screen when the player plays the online game. Thus, it is to be obvious that the form of the online game, in which a player is allowed to browse advertisements related to objects in the game display screen without spoiling interest of the player in the online game due to interruption of the online game, is great useful because it had never been implemented at the filing date of the present invention.

Figure 2:
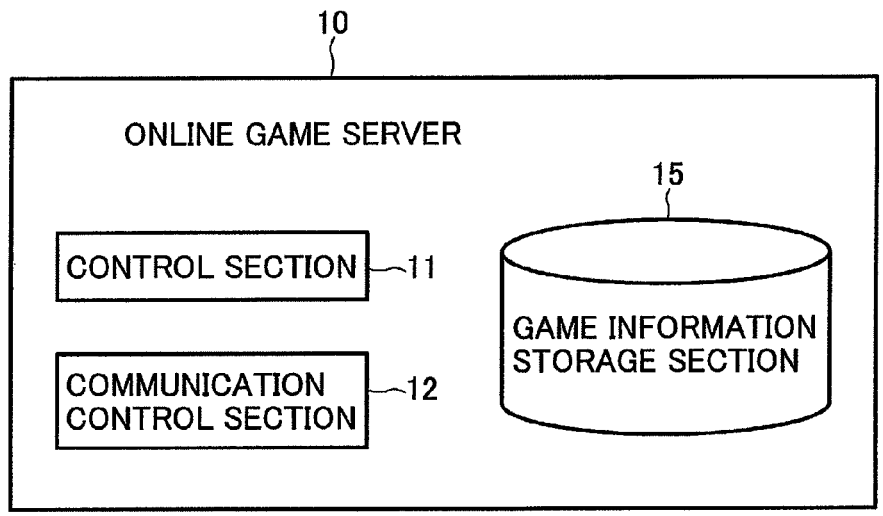
FIG. 2 is a block diagram that shows an example of a configuration of an online game server.

FIG. 2 is a block diagram that shows an example of a configuration of the online game server 10. As shown in FIG. 2, the online game server 10 includes a control section 11, a communication control section 12, and a game information storage section 15.

The control section 11 includes a CPU, a ROM, a RAM and the like, and executes control processes of the whole online game server 10 in accordance with control programs, for example, of various programs stored in the game information storage section 15.

The communication control section 12 has a function to carry out various communication processes between the player terminals 21 to 2N via the communication network 30 such as the Internet, for example.

The game information storage section 15 is configured from a database apparatus or the like, for example, and is a storage medium in which the control programs for the online game and various data are stored.

In this regard, the online game of the present embodiment is an adventure type game in which the player selects various objects provided in a three-dimensional virtual space using an input device such as a mouse, for example, the online game proceeds while the player figures out various puzzles (or mysteries) set up in a story of the online game, and the story of the online game is finally to be completed.

Figure 3:
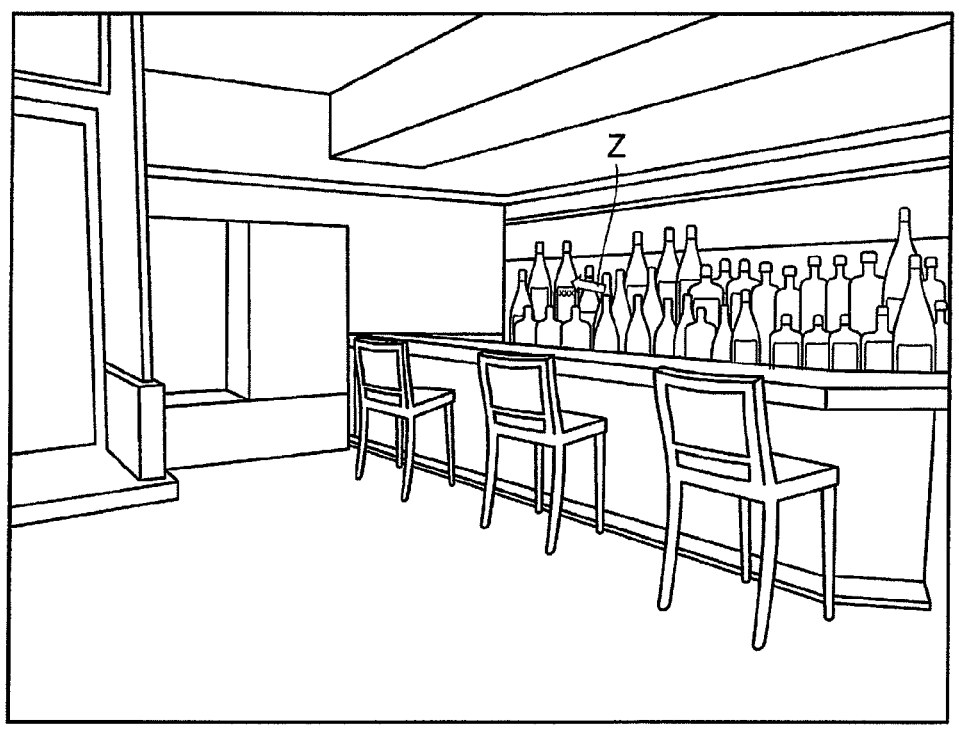
FIG. 3 is an explanatory drawing that illustrates an example of a game display screen of an online game.
Figure 4:
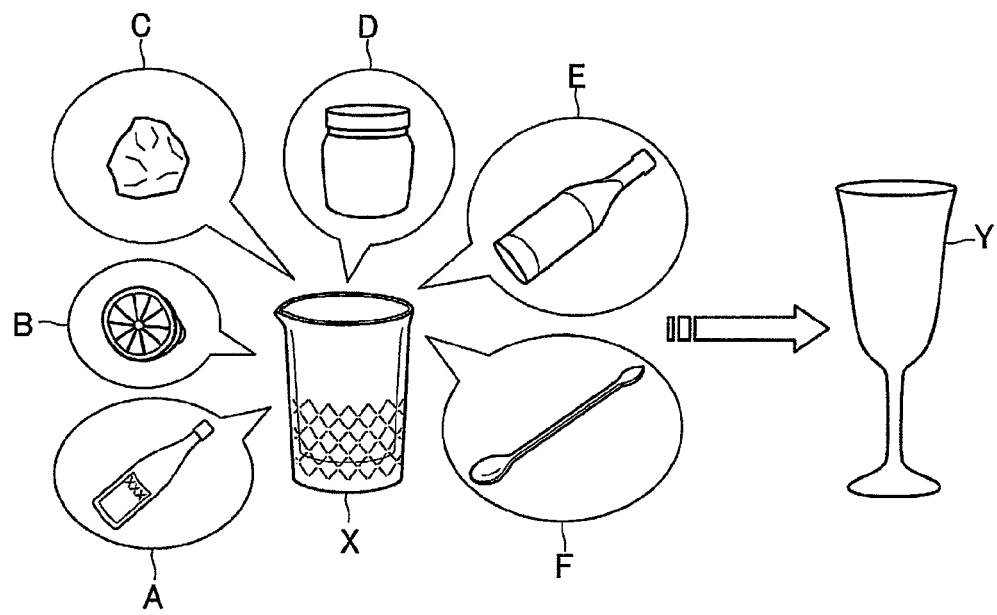
FIG. 4 is an explanatory drawing that illustrates a game object of the online game.
Figure 5:
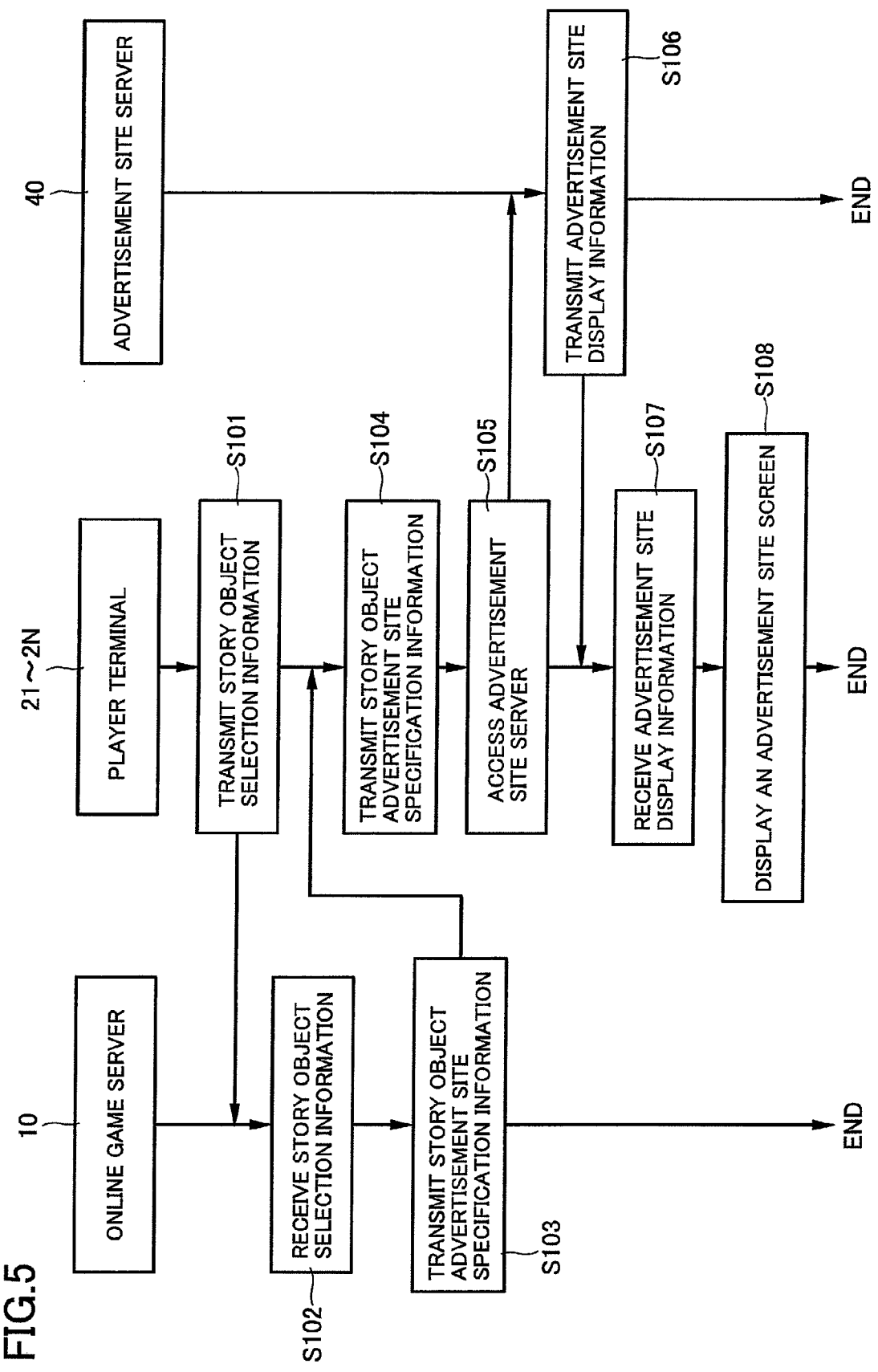
FIG. 5 is a flowchart that illustrates an example of a process during progress of the online game in the online game delivery system.

FIG. 3 is an explanatory drawing that illustrates an example of the game display screen of the online game according to the present embodiment. FIG. 4 is an explanatory drawing that illustrates a game object of the online game. FIG. 5 is a flowchart that illustrates an example of a process during progress of the online game in the online game delivery system 100. As shown in FIG. 3, in the game display screen of the online game of the present embodiment, a plurality of virtual space images that show, for example, the state of the inside of a saloon or a bar are displayed on the display screen of the display device while the story proceeds.

In these virtual space images, various objects such as chairs, a counter, a table, bottles of alcoholic drinks and the like are drawn like an actual saloon or bar. Story objects that are closely related to the story of the online game particularly (that is, objects necessary for progress of the online game) and articles (goods or products) that are actually manufactured and sold are also included in these objects. The player plays the online game while solving puzzles presented in the story of the online game, for example, by moving a cursor Z as shown with an outlined arrow in FIG. 3 to select an object drawn in these virtual space images by means of a click operation or the like, or by moving an object by means of a drag and drop operation.

In the online game of the present embodiment, as shown in FIG. 4, an object Y indicating a "cocktail glass" is searched for in addition to an object X indicating a "mixing glass" and objects A to F used in this object X through such operations of the player, for example. Thus, it is an object of the online game to complete a predetermined "cocktail" to be finally poured in the object Y by collecting all of the objects A to F, X, and Y with progress of the story of the online game.

In this regard, the above objects A to F indicate materials necessary for making a "cocktail", and indicate as follows, for example. Namely, the object A indicates "shochu (clear liquor) (or a bottle of shochu)", the object B indicates a "lemon", and the object C indicates "rock ice". Further, the object D indicates "yogurt (or a pot of yogurt)", the object E indicates "grenadine (pomegranate) syrup", and the object F indicates a "bar spoon".

In the online game of the present embodiment developed by such a story, the following processes are executed during progress of the online game. In this regard, the explanation will be made on the assumption that the player selects the story object described above by operating the player terminal 21 here. The explanation of processes other than the processes particularly related to the present invention may be omitted.

As shown in FIG. 5, the player terminal 21 first receives object selection information indicating that a story object is selected, and transmits the received story object selection information to the online game server 10 via the communication network 30 (Step S101).

The online game server 10 receives the story object selection information transmitted from the player terminal 21 via the communication network 30 (Step S102), and transmits story object advertisement site specification information to the player terminal 21 via the communication network 30 (Step S103). A series of processes of the present flowchart is then terminated. The story object advertisement site specification information is used for the player terminal 21 to access an advertisement site on which an advertisement related to the story object appears via the communication network 30.

In this regard, in the present flowchart, the player terminal 21 in advance downloads image data and the like indicating story objects in addition to various kinds of information relating to the online game from the online game server 10 to store them in a storage device with which the player terminal 21 is provided. However, the player terminal 21 may also download and store story object advertisement site specification information on all of story objects to be used in the online game from the online game server 10 at this time. In this case, in the player terminal 21, when a story object is selected, story object advertisement site specification information related to the story object is read out from a storage device of the player terminal 21. The processing flow then proceeds to Step S105 of the flowchart in FIG. 5, for example.

As the advertisement site specification information transmitted to the player terminal 21 at Step S103 described above, for example, a URL (as an example, http://www.ZZsaito-.com/shouhin/ and the like) which indicates an address of an advertisement site and a search formula for searching for the advertisement site using a search engine may be mentioned. In the case where the search formula is the advertisement site specification information, for example, conditions such as an article name capable of specifying a story object and a manufacturing company are included in the search formula (as one example, ["XXX" and "YYY"] or the like in the case of an advertisement site that is hit by means of the search using keywords "XXX" and "YYY"). Further, for example, in the case where the player wants to hit only a specific advertisement site that a sponsor company of the online game has, a search formula for searching for a search term in a specific domain can be used (as one example, ["XXX" and "YYY" and "ZZsaito.com"] or the like in the case of an advertisement site that is hit by means of the search using keywords "XXX" and "YYY" and resides in a domain "ZZsaito.com").

The player terminal 21 receives the story object advertisement site specification information transmitted from the online game server 10 via the communication network 30 (Step S104), and accesses the advertisement site server 40 via the communication network 30 on the basis of the received advertisement site specification information (Step S105).

In the case where there is access from the player terminal 21, the advertisement site server 40 transmits advertisement site display information for causing the display device to display the advertisement site specified by the advertisement site specification information on the display screen to the player terminal 21 via the communication network 30 (Step S106). A series of processes of the present flowchart is then terminated.

The player terminal 21 receives the advertisement site display information transmitted from the advertisement site server 40 via the communication network 30 (Step S107), and causes the display device to display an advertisement site screen based on the advertisement site display information on the display screen of the display device (Step S108). A series of processes of the present flowchart is then terminated.

Figure 7:
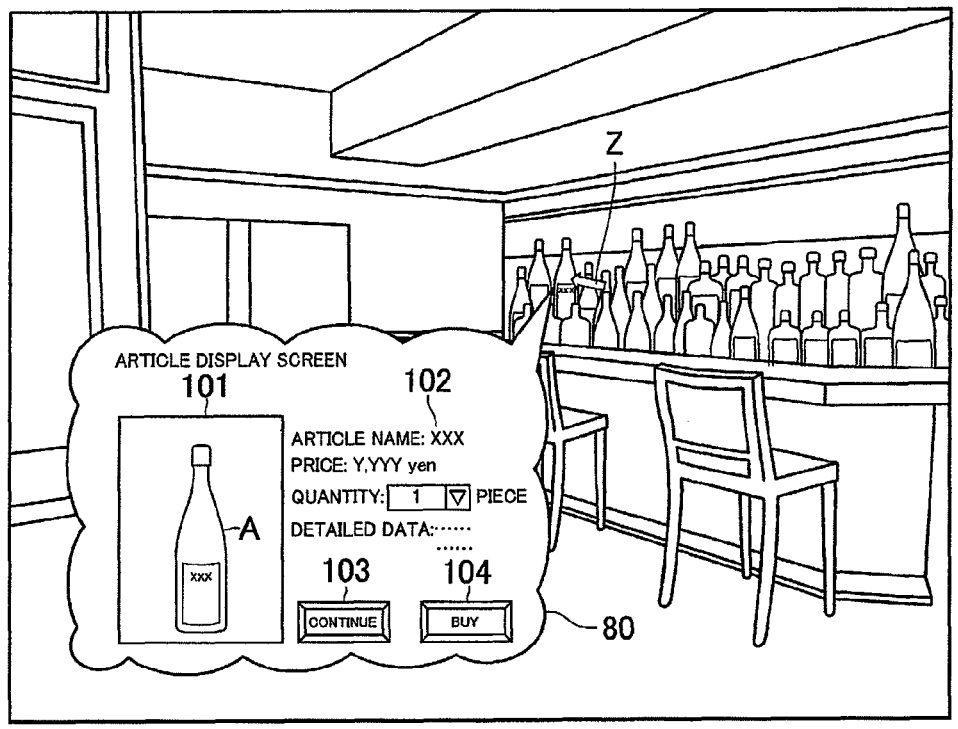
FIG. 7 is an explanatory drawing that illustrates an example of the game display screen on which the advertisement site screen is displayed.

In this regard, in this process at Step S108, the advertisement site screen may be displayed with various forms including a form in which it is displayed in the game display screen displayed on the display screen of the display device in the player terminal 21, a form in which it is displayed side by side with the game display screen, a form in which it is displayed on a display screen of another display device separate from the display device on which the game display screen is displayed, and a form in which it is displayed on a display screen of an external display device that is connected to the player terminal 21. For example, as shown in FIG. 7, a balloon-like window 80 having a starting point at the story object selected by the cursor Z is displayed in the game display screen, and the advertisement site screen may be displayed in this window 80. By displaying the advertisement site screen in this manner, browsing of the advertisement is harmonized as part of playing the online game, and the advertisement and the like can be smoothly displayed without uncomfortable feeling. This makes it possible for the player to keep playing the online game successfully without spoiling interest of a player in the online game.

Figure 6:
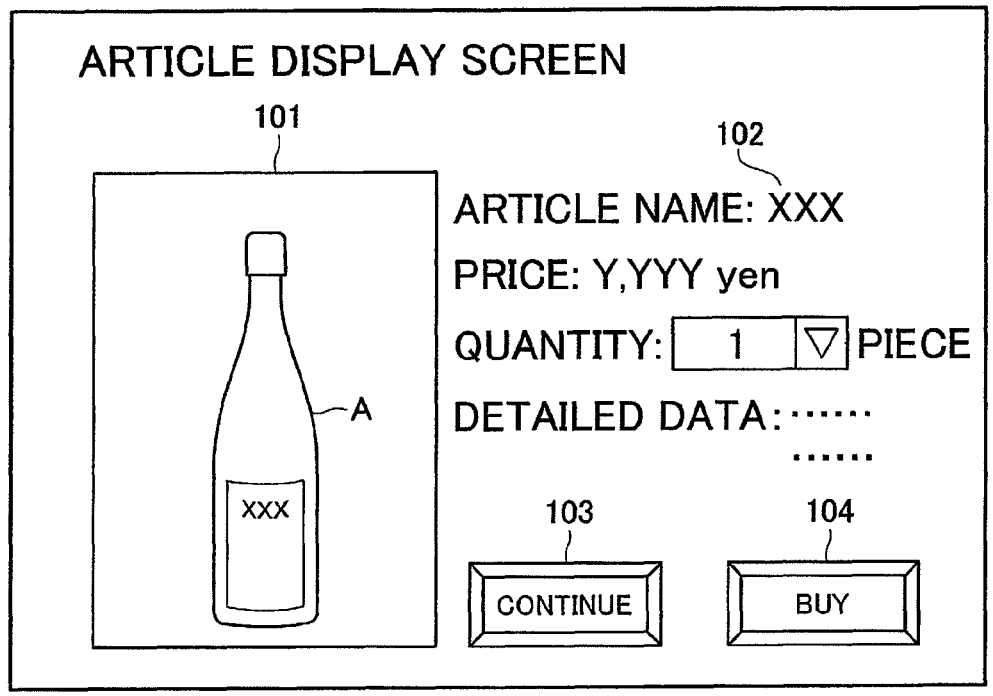
FIG. 6 is an explanatory drawing that illustrates an example of an advertisement site screen.

FIG. 6 is an explanatory drawing that illustrates an example of an advertisement site screen displayed on the display screen of the display device in the player terminal 21 at Step S108 of the above flowchart. As shown in FIG. 6, an advertisement site screen is displayed as an article display screen, for example, and this article display screen is constituted as follows.

Namely, an article image display region 101, an article data display region 102, a "continue" button 103 and a "buy" button 104 are provided on the article display screen. An actual article image of the story object (or object) selected by the player is displayed in the article image display region 101. An article name "XXX", a price "Y,YYY yen", a quantity "1 piece" and other detailed data of the article (here, actual articles of the object A) displayed in the article image display region 101 are displayed in the article data display region 102. The "continue" button 103 is specified (or pressed) for terminating the display of the article display screen to return to the game display screen and for playing a continuation of the online game. The "buy" button 104 is specified (or pressed) for shifting to a buying page of the article displayed on the article display screen. In this regard, the quantity of articles displayed in the article data display region 102 is configured so as to be capable of being changed by means of a pull-down menu.

In this article display screen (that is, advertisement site screen), game progress information necessary (essential) for progress of the online game that the player plays is included. Namely, the game progress information is included in the detailed data of the article data display region 102 in this article display screen, for example, and it is displayed like "the volume required to make a cocktail is AA ml" or the like.

In the online game of the present embodiment, the player is required to solve a puzzle of query formation such as "how much the volume of shochu required to make a cocktail is?" in the case where the player found out the above object X while the online game proceeds practically, for example. When the player selects the object A in order to solve this puzzle, an advertisement site screen (article display screen) for this object A is displayed, and this allows the player to obtain game progress information necessary for solution of a puzzle.

Therefore, according to the online game of the present embodiment, the player is caused to browse an advertisement and the like of the object in the game display screen as part of playing the online game without interruption of playing the online game, and this allows the player to carry out progress of the online game smoothly. This does not spoil interest of a player in the online game.

In this regard, in the flowchart shown in FIG. 5, it has been described that the advertisement site of the story object (or object) is displayed. However, the player terminal 21 may be configured so that a related site related to the story object (for example, a site on which the object is introduced, or the like) is displayed in addition to the advertisement site.

Further, there is no need that the player terminal 21 is connected to the online game server 10 via the communication network 30 and the player terminal 21 does not access the advertisement site until the advertisement site specification information is received. For example, in the case where the object, which is displayed so that it can be selected in the game display screen of the online game executed in the player terminal 21 by the player, is selected, the player terminal 21 may search for a related site of this object and access the related site on the basis of a result of search.

In this case, the search for the related site is carried out using a search engine, for example. In the case where a result of search includes a plurality of related sites, the player terminal 21 may access the related site that is placed on the highest rank by the search engine by priority. This allows the player terminal 21 to access a related site surely even in the case where the address or the like of the related site is changed.

Further, the online game server 10 may accumulate accounting information for a site administrator of the advertisement site server 40 in the game information storage section 15 shown in FIG. 2, for example. When the advertisement site specification information is transmitted to the player terminal 21, the number of times of access may be counted up on the assumption that access to the advertisement site server 40 is carried out by the player terminal 21, for example. The accounting information may be accumulated in the game information storage section 15 in accordance with the number of times of access thus counted up. By accumulating the accounting information, it is possible to widely provide the online game in which advertisement effects can be heightened by allowing the player terminal 21 not only to access the advertisement site effectively without placing financial burdens such as a development cost and a management cost of the online game on the side of delivering the online game, such as an administrator of the online game server 10, but also to increase the number of times of access.

As described above, in the embodiment described above, the online game server 10 is constructed so that, in the case where any of the objects A to F and the like selectably displayed in the game display screen of the online game played in the player terminals 21 to 2N operated by their players is selected, the advertisement site specification information in which the game progress information necessary for progress of the online game is included and used for the player terminals 21 to 2N to access the advertisement site for the objects A to F is transmitted to the player terminals 21 to 2N. Thus, when the objects A to F or the like in the game display screen are selected during progress of the online game, access to the advertisement site for the objects A to F or the like is carried out, and this makes it possible to display the advertisement site screen, for example. Therefore, advertisement can be carried out as part of playing the online game without spoiling interest of a player in the online game by causing the player to browse the advertisement for the object in the online game without interruption of playing the online game.

Further, in the embodiment described above, the player terminal is constructed so as to be capable of accessing not only the advertisement site but also the related site related to the objects A to F or the like. Therefore, the player is allowed to browse the related information of the object without interruption of the online game.

In this regard, the site specification information for causing the player terminals 21 to 2N to access the advertisement site or related site (hereinafter, generically referred to as a "site") may be a URL that indicates an address of the site or a search formula for searching for the site using a search engine. Therefore, it is possible to surely access these sites easily and directly from the player terminals 21 to 2N without the aid of the online game server 10.

Moreover, in the embodiment described above, the online game delivery system 100 is constructed so that the number of times of access is counted up on the assumption that access to a site is carried out by the player terminals 21 to 2N when the online game server 10 transmits site specification information for the site to the player terminals 21 to 2N, and the accounting information for an administrator of this site is accumulated in accordance with the number of times of access thus counted up. Therefore, it is possible to widely provide the online game by which the player terminal 21 is allowed not only to access the related site effectively without placing financial burdens such as a development cost and a management cost of the online game on the side of delivering the online game, but also to increase the number of times of access.

Furthermore, in the embodiment described above, each of the player terminals 21 to 2N is constructed so that, when the player terminals 21 to 2N uniquely receive selection of the objects A to F or the like, which are selectably displayed on the game display screen of the online game, by the player, it can search for sites and access the sites on the basis of a result of search. Thus, when the objects A to F or the like in the game display screen are selected by the player during progress of the online game, the player terminal 21 can access the sites that show advertisements and related information of the object. This allows the player terminal 21 to surely access the site without interruption of the online game as part of playing the online game without spoiling interest of a player in the online game.

Further, in the embodiment described above, the player terminal 21 is constructed so that, in the case where a result of search includes a plurality of sites when the player terminal 21 searches for sites using a search engine, the player terminal 21 accesses the site that is placed on the highest rank by the search engine. This allows the player terminal 21 to access any site necessarily even in the case where the address or the like of the site is changed.

The present invention can be applied to an online game server, an online game program product and a game apparatus for delivering an online game, which is played in a player terminal by a player, to the player terminal via a communication network. Therefore, the present invention is useful.

What is claimed is:

1. A game-use-type advertisement distribution system comprising:
an online game server that delivers an online game to a player terminal via a communication network, the online game being played in the player terminal operated by a player and including a quiz to be solved and at least one object; and
an advertisement site server that delivers an advertisement site to the player terminal, the advertisement site being related to the at least one object in the online game,
wherein the online game server comprises:
a quiz provider that provides the quiz to the player terminal, solving the quiz being indispensable to completion of a story of the online game;
a story object provider that provides a story object, which is one of the at least one object in the online game and is related to an answer to the quiz, to a game display screen of the online game;
a selection information receiver that receives object selection information, the object selection information indicating that the story object is selected at the player terminal; and
a specification information transmitter that transmits advertisement site specification information to the player terminal based on the object selection information received by the selection information receiver, the advertisement site specification information being used by the player terminal to access the advertisement site, the advertisement site including an advertisement for the story object posted in the advertisement site and, game progress information comprising the answer to the quiz,
wherein the advertisement site server comprises:
an advertisement site display information transmitter that transmits advertisement site display information to the player terminal when the advertisement site is accessed from the player terminal based on the advertisement site specification information received from the online game server, the advertisement site display information being used to display an advertisement site screen on the game display screen, the advertisement site screen displaying the advertisement site specified by the advertisement site specification information,
wherein the advertisement site screen comprises a balloon-shaped window originating from the selected story object, the balloon-shaped window including a product image display region and a product data display region, the product image display region displaying a product image of the selected story object, and the product data display region displaying product data related to a product displayed in the product image display region, the product data including the game progress information, the product image display region and the product data display region being displayed in the balloon-shaped window, and
wherein the answer to the quiz is displayed.

2. The game-use-type advertisement distribution system according to claim 1, wherein the advertisement site specification information is a URL indicating an address of the advertisement site.

3. The game-use-type advertisement distribution system according to claim 2, further comprising:
   an access counter that counts a number of access times when the specification information transmitter transmits the advertisement site specification information to the player terminal, the transmission of the advertisement site specification information indicating that access to the advertisement site is carried out by the player terminal; and
   an accounting information accumulator that accumulates accounting information for an administrator of the advertisement site in accordance with the number of access times counted by the access counter, the accounting information being accumulated in a game information storage included in the online game server.

4. The game-use-type advertisement distribution system according to claim 1, wherein the advertisement site specification information is a search formula for searching for the advertisement site using a search engine.

5. The game-use-type advertisement distribution system according to claim 4,
   wherein the search formula includes at least one condition specifying the story object, the at least one condition being selected from among a product name, a manufacturing company name, and a domain name.

6. The game-use-type advertisement distribution system according to claim 5, further comprising:
   an access counter that counts a number of access times when the specification information transmitter transmits the advertisement site specification information to the player terminal, the transmission of the advertisement site specification information indicating that access to the advertisement site is carried out by the player terminal; and
   an accounting information accumulator that accumulates accounting information for an administrator of the advertisement site in accordance with the number of access times counted by the access counter, the accounting information being accumulated in a game information storage included in the online game server.

7. The game-use-type advertisement distribution system according to claim 4, further comprising:
   an access counter that counts a number of access times when the specification information transmitter transmits the advertisement site specification information to the player terminal, the transmission of the advertisement site specification information indicating that access to the advertisement site is carried out by the player terminal; and
   an accounting information accumulator that accumulates accounting information for an administrator of the advertisement site in accordance with the number of access times counted by the access counter, the accounting information being accumulated in a game information storage included in the online game server.

8. The game-use-type advertisement distribution system according to claim 1, further comprising:
   an access counter that counts a number of access times when the specification information transmitter transmits the advertisement site specification information to the player terminal, the transmission of the advertisement site specification information indicating that access to the advertisement site is carried out by the player terminal; and
   an accounting information accumulator that accumulates accounting information for an administrator of the advertisement site in accordance with the number of access times counted by the access counter, the accounting information being accumulated in a game information storage included in the online game server.

9. The game-use-type advertisement distribution system according to claim 1,
   wherein when the story object is selected at the player terminal, the object selection information is sent from the player terminal to the online game server, and the advertisement specification information is sent from the online game server to the player terminal, in response to the object selection information, and
   upon receiving the advertisement specification information, the advertisement site in the advertisement site server is accessed by the player terminal based on the advertisement specification information received from the online game server.

10. The a game-use-type advertisement distribution system according to claim 1, wherein, the quiz comprises making recipe, the story object comprises an ingredient to make the recipe, and the answer to the quiz comprises an amount of the ingredient necessary to make the recipe.

\* \* \* \* \*